United States Patent
Collins et al.

(10) Patent No.: US 11,146,058 B2
(45) Date of Patent: Oct. 12, 2021

(54) METHOD AND CIRCUIT FOR DETECTING AN ARC FAULT

(71) Applicant: GE Aviation Systems Limited, Cheltenham (GB)

(72) Inventors: John Oliver Collins, Cheltenham (GB); Russell Mark Compton, Droitwich Spa (GB)

(73) Assignee: GE Aviation Systems Limited, Cheltenham (GB)

( * ) Notice: Subject to any disclaimer, the term of this patent is extended or adjusted under 35 U.S.C. 154(b) by 171 days.

(21) Appl. No.: 16/509,652

(22) Filed: Jul. 12, 2019

(65) Prior Publication Data

US 2020/0021107 A1     Jan. 16, 2020

(30) Foreign Application Priority Data

Jul. 13, 2018   (GB) ..................................... 1811533
Dec. 13, 2018  (GB) ..................................... 1820340

(51) Int. Cl.
| | |
|---|---|
| *H02H 7/22* | (2006.01) |
| *H02H 1/00* | (2006.01) |
| *B64D 47/00* | (2006.01) |
| *H02J 4/00* | (2006.01) |

(52) U.S. Cl.
CPC ............ *H02H 7/222* (2013.01); *B64D 47/00* (2013.01); *H02H 1/0015* (2013.01); *H02J 4/00* (2013.01); *B64D 2221/00* (2013.01)

(58) Field of Classification Search
CPC ........ H02H 7/222; H02H 1/0015; H02H 3/05; H02H 3/385; H02H 3/023; H02H 7/262; H02H 7/263; B64D 47/00; B64D 2221/00; H02J 4/00; G01R 31/00; G01R 31/008; G01R 31/08; G01R 31/1272; G01R 31/14; G01R 31/20; G01R 31/25; G01R 31/58; H01H 1/0015
USPC .......................................................... 361/13
See application file for complete search history.

(56) References Cited

U.S. PATENT DOCUMENTS

| | | | |
|---|---|---|---|
| 4,618,906 A | 10/1986 | Paice et al. | |
| 5,555,456 A | 9/1996 | Waite | |
| 6,633,824 B2 | 10/2003 | Dollar, II | |
| 6,876,203 B2 | 4/2005 | Blades | |
| 9,394,084 B1 | 7/2016 | Edwards et al. | |
| 9,413,162 B2 | 8/2016 | Brouwer et al. | |
| 9,561,764 B2 | 2/2017 | Sechrist | |

(Continued)

FOREIGN PATENT DOCUMENTS

| | | |
|---|---|---|
| EP | 33278861 | 5/2018 |
| GB | 2546553 | 7/2017 |
| GB | 2556081 A | 5/2018 |

OTHER PUBLICATIONS

Handy; System and method for protecting a solid state power controller; May 30, 2018; specification and drawings (Year: 2018).*

(Continued)

*Primary Examiner* — Dharti H Patel
(74) *Attorney, Agent, or Firm* — McGarry Bair PC

(57) ABSTRACT

A method and circuit for determining and extinguishing electrical faults includes a power supply, and electrical load, a controller module, and electrical sensors, and when the controller module does not extinguish the electrical fault, another switch blows a fuse.

19 Claims, 4 Drawing Sheets

(56) References Cited

U.S. PATENT DOCUMENTS

| | | |
|---|---|---|
| 9,762,047 B2 | 9/2017 | Pan et al. |
| 9,768,605 B2 | 9/2017 | Kolker et al. |
| 9,941,683 B2 | 4/2018 | Olivas et al. |
| 9,989,041 B2 | 6/2018 | Stickelmaier et al. |
| 2006/0092585 A1* | 5/2006 | Chan ........................ H02H 1/04 361/42 |
| 2013/0329329 A1 | 12/2013 | Liu et al. |

OTHER PUBLICATIONS

European Patent Office, European Search Report re Application No. 19186120.2-1202, Dec. 9, 2019, 8 pages, Munich, Germany.
Intellectual Property Office, Combined Search and Examination Report under Sections 17 and 18(3) re Application No. 326903-GB-2, dated Jun. 20, 2019, 7 pages, South Wales, NP.

\* cited by examiner

METHOD AND CIRCUIT FOR DETECTING AN ARC FAULT

CROSS-REFERENCE TO RELATED APPLICATIONS

This application claims the benefit of United Kingdom Patent Application No. 1811533.7, filed Jul. 13, 2018, and United Kingdom Patent Application No. 1820340.6, filed Dec. 13, 2018, both of which are incorporated herein by reference in their entirety.

BACKGROUND

Electrical power distribution systems manage the allocation of power from energy sources to electrical loads that consume distributed electrical power. In aircraft, gas turbine engines that propel the aircraft typically also provide mechanical energy that ultimately powers a number of different accessories such as generators, starter/generators, permanent magnet alternators (PMA), fuel pumps, and hydraulic pumps, i.e., equipment for aircraft functions other than propulsion. As well, contemporary aircraft need electrical power for electrical loads related to avionics, communications, motors, and other electric equipment.

Over time, aircraft electrical power source voltages have increased. Aircraft with 14- and 28-volt direct current (VDC) electrical power systems have given way to aircraft with electrical power systems operating at 115 volts alternating current (VAC) and 230 VAC. Presently, aircraft can include one or more electrical power sources that operate at voltages including plus/minus 270 VDC or 270V and deliver high current that often ranges, for example, from 40 to 100 Amperes. A current wide-body twin-engine commercial jet liner uses a hybrid voltage electrical system that includes sub-systems operating at voltages of 230 VAC, 115 VAC, 28 VDC along with a bipolar, high voltage, direct current subsystem that includes plus and minus 270 VDC sources.

In addition to voltage and current distribution buses, electrical power distribution systems employ electrical bus bars and miles of wiring for delivering power from energy sources to the electrical loads. In the event of an electrical arc fault or other failure condition, high currents might be transmitted through an unintended medium, such as air, dielectric materials, an electrically grounded connection, or the like, resulting in unexpected operations of the electrical circuit. The unexpected operations of the electrical circuit can cause the circuit, or other unintentionally coupled medium, to fail.

BRIEF DESCRIPTION

In one aspect, the present disclosure relates to a method of detecting a fault in a circuit, the method including sensing a power characteristic at a switch output, receiving, at a controller module, the sensed power characteristic, determining, in the controller module, a presence of a fault in the circuit, generating a first control signal to open the switch, determining, in the controller module, whether the fault in the circuit is still occurring, and if the fault is still occurring, generating a second control signal to close an active pull down switch.

In another aspect, the present disclosure relates to a method of detecting a fault in a circuit, the method including comparing, in a comparator module, a sensed power characteristic with a threshold value representative of an occurrence of a fault in the circuit, determining, by the comparator module, a fault is present based on the comparing, generating a first control signal to open a power switch to disable supplying power upstream of the fault, and upon a failure to open the power switch to disable supplying power upstream of the fault, generating a second control signal to close an active pull down switch to redirect supplying power to an electrical ground.

In yet another aspect, the present disclosure relates to a circuit, including a power switch operable to supply power from a power source to an electrical load, a sensor configured to sense an electrical characteristic of the circuit, a controller module communicatively connected with the power switch and the sensor, and configured to control a supplying of power from the source to the electrical load, to receive the sensed electrical characteristic of the circuit, and to controllably cease the supplying of power from the power source to the electrical load, by the power switch, in response to determining the received sensed electrical characteristic is indicative of a presence of a fault, and a comparator module communicatively connected with the sensor and configured to receive the sensed electrical characteristic of the circuit, and upon failure of the controller module to controllably cease the supplying of power from the source to the electrical load by the power switch, operably control an active pull down switch to redirect the supplying power from the power source to an electrical ground.

DETAILED DESCRIPTION

Figure 1:
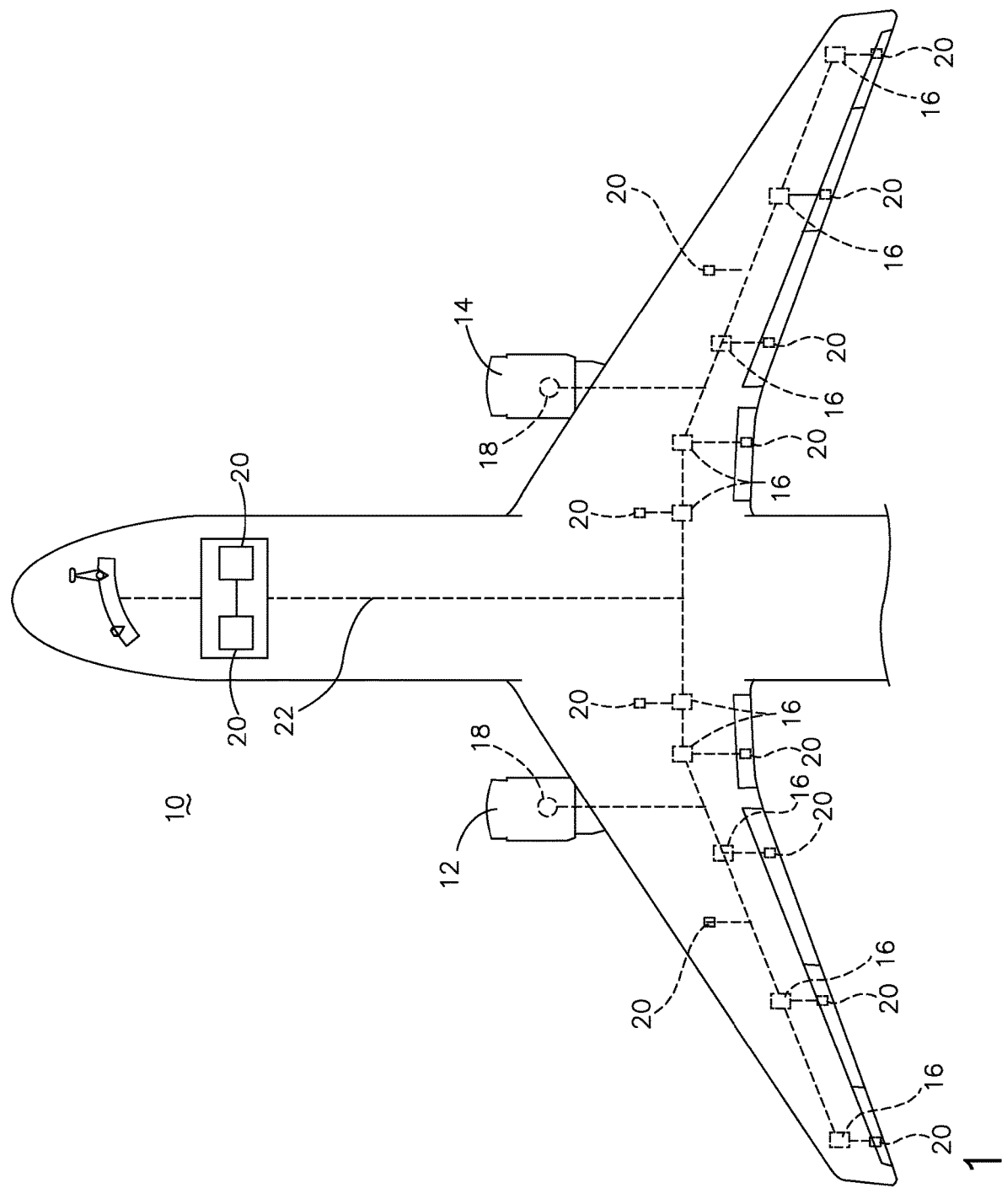
FIG. 1 is a top down schematic view of an aircraft and power distribution system in an aircraft in accordance with various aspects described herein.

The described aspects of the present disclosure are directed to a method and apparatus associated with a power distribution network, system, circuit, or a combination thereof. One example environment where such a method and apparatus can be used includes, but is not limited to, a power distribution system for an aircraft. While this description is primarily directed toward a power distribution system for an aircraft, it is also applicable to any commercial or residential environment using a power distribution system where input power is received, acted upon (if necessary), and distributed to one or more electrical loads.

While "a set of" various elements will be described, it will be understood that "a set" can include any number of the respective elements, including only one element. As used herein, the terms "axial" or "axially" refer to a dimension along a longitudinal axis of a component or along a longitudinal axis of the component. Also as used herein, while sensors can be described as "sensing" or "measuring" a respective value, sensing or measuring can include determining a value indicative of or related to the respective value, rather than directly sensing or measuring the value itself. The sensed or measured values can further be provided to additional components. For instance, the value can be provided to a controller module or processor, and the controller module or processor can perform processing on the value to determine a representative value or an electrical characteristic representative of said value.

While terms such as "power" can be used herein, it will be evident to one skilled in the art that these terms can be relative to, or related to respective voltages, currents, or a combination thereof, when describing aspects of the electrical circuit, or circuit operations. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. In non-limiting examples, connections or disconnections can be selectively configured, connected, or connectable to provide, enable, disable, or the like, an electrical connection between respective elements. In non-limiting examples, connections or disconnections can be selectively configured to provide, enable, disable, or the like, an electrical connection between respective elements. Non-limiting example power distribution bus connections or disconnections can be enabled or operated by way of switching, bus tie logic, or any other connectors configured to enable or disable the energizing of electrical loads downstream of the bus.

As used herein, a "system" or a "controller module" can include at least one processor and memory. Non-limiting examples of the memory can include Random Access Memory (RAM), Read-Only Memory (ROM), flash memory, or one or more different types of portable electronic memory, such as discs, DVDs, CD-ROMs, etc., or any suitable combination of these types of memory. The processor can be configured to run any suitable programs or executable instructions designed to carry out various methods, functionality, processing tasks, calculations, or the like, to enable or achieve the technical operations or operations described herein. The program can include a computer program product that can include machine-readable media for carrying or having machine-executable instructions or data structures stored thereon. Such machine-readable media can be any available media, which can be accessed by a general purpose or special purpose computer or other machine with a processor. Generally, such a computer program can include routines, programs, objects, components, data structures, algorithms, etc., that have the technical effect of performing particular tasks or implement particular abstract data types.

As used herein, a controllable switching element, or a "switch" is an electrical device that can be controllable to toggle between a first mode of operation, wherein the switch is "closed" intending to transmit current from a switch input to a switch output, and a second mode of operation, wherein the switch is "open" intending to prevent current from transmitting between the switch input and switch output. In non-limiting examples, connections or disconnections, such as connections enabled or disabled by the controllable switching element, can be selectively configured to provide, enable, disable, or the like, an electrical connection between respective elements.

The aspects of the disclosure can be implemented in any electrical circuit environment having a switch. A non-limiting example of an electrical circuit environment that can include aspects of the disclosure is an aircraft power system architecture, which enables production of electrical power from at least one spool of a turbine engine, preferably a gas turbine engine, and delivers the electrical power to a set of electrical loads via at least one solid state switch, such as a solid state power controller (SSPC) switching device. One non-limiting example of the SSPC can include a silicon (Si) or silicon carbide (SiC) or Gallium Nitride (GaN) based, high power switch. SiC or GaN can be selected based on their solid state material construction, their ability to handle high voltages and large power levels in smaller and lighter form factors, and their high speed switching ability to perform electrical operations very quickly. Additional switching devices or additional silicon-based power switches are contemplated.

Additionally, as used herein, an electrical arc or arcing event is an untended or undesired conduction of current across a traditionally non-conductive medium, such as air. For example, in non-limiting instances, a parallel arc can include an arcing event at least partially connecting two points which are intended to be insulated from each other. In another non-limiting instance, a series arc can include an arcing event in which a conductive medium becomes non-conductive or poorly conductive between two parts of an intended conductive path. Furthermore, in non-limiting instances, an arcing event or an "arc fault" can include the unexpected power loss situation, regardless of whether there is an obvious arc manifestation (e.g. a visible or visually identifiable occurrence). In another non-limiting instance, a series arc can include an unexpected impedance. While "arc faults" and "electrical arcs" are described herein for understanding, aspects of the disclosure are applicable to any electrical faults, including leakage current faults, dielectric breakdowns, arc faults, or the like.

Electrical arcs might occur in an environment where, for example, physical defects in an electrical connection cause a permanent or temporary loss in transmission capabilities. Where a physical separation occurs, the voltage difference between each of the separated terminals in addition to a short distance of separation, can allow for an electrical arc to strike between the terminals. In an environment with vibrations, for instance, as in a moving aircraft, a physical defect in an electrical connection might result in intermittent arcing events as the vibrations disconnect and reconnect the electrical connection at the point of the physical defect. In another example aspect, an electrical arc might be caused by, or relate to a loose terminal connection, or a drawn series fault.

The exemplary drawings are for purposes of illustration only and the dimensions, positions, order and relative sizes reflected in the drawings attached hereto can vary.

As illustrated in FIG. 1, an aircraft 10 is shown having at least one engine, most commonly a turbine engine, shown as a left engine system 12 and a right engine system 14. Alternatively, the power system can have fewer or additional engine systems. The left and right engine systems 12, 14 can be substantially alike or identical, and can further include at least one power source, such as an electric machine or a generator 18 in each respective engine system 12, 14. While one generator 18 is schematically illustrated, aspects of the disclosure can be included wherein a set of generators are utilized for power generation, for example, at a single engine system 12, 14.

The aircraft is shown further having a set of power-consuming components, or electrical loads 20, such as for instance, an actuator load, flight critical loads, and non-flight critical loads. The electrical loads 20 are electrically coupled with at least one of the generators 18 via a power distribution system including, for instance, power transmission lines 22, conductors, bus bars, a set of power distribution nodes 16, or the like. It will be understood that the illustrated aspects of the disclosure of FIG. 1 is only one non-limiting example of a power distribution system, and many other possible aspects and configurations in addition to that shown are contemplated by the present disclosure. Furthermore, the number of, and placement of, the various components depicted in FIG. 1 are also non-limiting examples of aspects associated with the disclosure.

In the aircraft 10, the operating left and right engine systems 12, 14 provide mechanical energy which can be extracted, typically via a turbine engine spool, to provide a driving force for the generator 18. The generator 18, in turn, generates power, such as direct current (DC) power or alternating current (AC) power, and provides the generated power to the transmission lines 22. In non-limiting aspects of the disclosure, the transmission lines 22, or power distribution nodes connected therewith, can, for example, provide switching, power conversion, or distribution management functions, as needed, in order to provide the desired electrical power to the electrical loads 20 for load operations.

Example power distribution management functions can include, but are not limited to, selectively enabling or disabling the delivery of power to particular electrical loads 20, depending on, for example, available power distribution supply, criticality of electrical load 20 functionality, or aircraft mode of operation, such as take-off, cruise, or ground operations. Additional management functions can be included. Furthermore, additional power sources for providing power to the electrical loads 20, such as emergency power sources, ram air turbine systems, starter/generators, or batteries, can be included, and can substitute for the power source. It will be understood that while one aspect of the disclosure is shown in an aircraft environment, the disclosure is not so limited and has general application to electrical power systems in non-aircraft applications, such as other mobile applications and non-mobile industrial, commercial, and residential applications.

Figure 2:
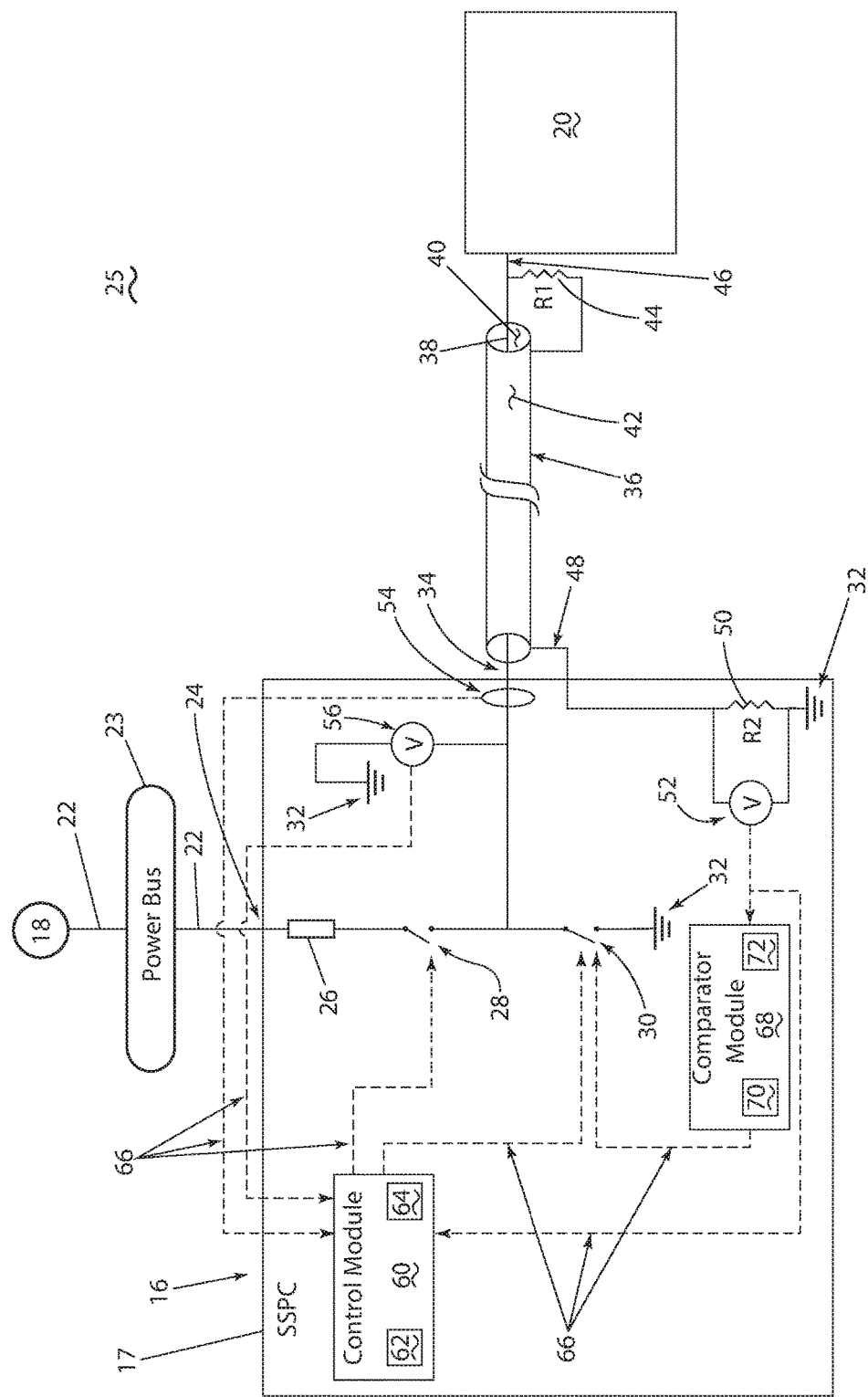
FIG. 2 is a schematic view of a circuit of the power distribution system of FIG. 1, in accordance with various aspects described herein.

FIG. 2 illustrates a non-limiting schematic example of a power distribution system, shown as a schematic circuit 25. As shown, the circuit 25 can include aspects of the power distribution system of FIG. 1, including the generator 18, the power distribution node 16, shown as a solid state power controller (SSPC) 17, and the electrical load 20. The generator 18 is electrically connected with a representative power bus 23 by way of transmission lines 22, and the power bus 23 is further connected with the SSPC 17 at an input 24 by way of the transmission lines 22. The SSPC 17 includes an output 34 electrically connected with an input 46 of the electrical load 20 by way of a power cable 36.

The SSPC 17 can further include a fuse 26 connected with the SSPC input 24 and a first switchable element, such as a first switch 28. The first switch 28 can further be connected with a second switchable element, such as a second switch 30, further connected with electrical ground 32. The first switch 28 can also be connected with the SSPC output 34. In one non-limiting example, the first switch 28 can be considered the primary power switch, as it controls the enabling or disabling of power normally received at the SSPC input 24 and transmitted to the SSPC output 34. Similarly, in another non-limiting example, the second switch 30 can be considered an active pull down switch, and can control the enabling or disabling of a "leakage current drain," whereby current leakage from the SSPC 17 is provided a grounding conductive pathway so the leakage current is not supplied to the SSPC output 34.

The fuse 26 can be an electrical element adapted or configured to break an electrical connection between the SSPC input 24 and the SSPC output 34 in response to the fuse 26 experiencing or being exposed to a set of electrical characteristics exceeding a predetermined or preselected protection characteristic defined by the fuse 26. For example, current higher than the fuse current protection characteristic can result in reversible or irreversible breaking or destruction of the fuse (i.e. "blowing" the fuse 26), disconnecting the electrical connection between the SSPC input 24 and the SSPC output 34.

The SSPC 17 can further include a first voltage sensor 56 positioned between the first switch 28 and the SSPC output 34, and an electrical ground 32. The first voltage sensor 56 can be adapted or configured to detect, sense, or measure a voltage at the SSPC output 34. The SSPC 17 can also include a current sensor 54 positioned between the first switch 28 and the SSPC output 34, and can be adapted or configured to detect, sense, or measure a current provided or supplied at the SSPC output 34.

The SSPC 17 can also include a controller module 60, having a processor 62 and memory 64. The controller module 60 can receive the sensed or measured voltage from the first voltage sensor 56 and the sensed or measured current from the current module 54. The controller module 60 can also be communicatively connected with the first switch 28 and the second switch 30. As shown, the controller module 60 can be communicatively connected with the respective components 28, 30, 54, 56 by way of communication lines 66.

The power cable 36 can include an electrical conductor 38 extending between the SSPC output 34 and the electrical load input 46, enveloped or encircled by a dielectric material 40. The dielectric material 40 can further be enveloped or encircled by a conductive shielding or sheath layer 42. While not show, the conductive sheath layer 42 can further be enveloped or encircled by further layers. In one non-limiting example, the power cable 36 can be a substantially cylindrical composition, wherein the conductor 38 extends along a longitudinal axis, radially encompassed by the dielectric material 40, which is further radially encompassed by the conductive sheath 42. One non-limiting example of the power cable 36 can include a coaxial connecting cable. The conductor 38 can be electrically connected with the conductive sheath 42 via a first impedance element 44, shown as a first resistor R1.

The SSPC 17 can include a second voltage sensor 52 electrically connected with the conductive sheath layer 42 by a conductor 48, and can be adapted or configured to detect, sense, or measure a voltage between the conductive sheath layer 42 and electrical ground 32. For example, the second voltage sensor 52 can sense or measure a voltage across an example second impedance element 50, shown as a second resistor R2. The second voltage sensor 52 can be further adapted or configured to provide, supply, or communicate the sensed or measured voltage to both the controller module 60 and a comparator module 68, by way of communication lines 66. As shown, the comparator module 68 can also include a processor 70 and memory 72. While not shown, the first voltage sensor 56 can further provide the sensed or measured voltage to the comparator module 68. In yet another non-limiting example, the controller module 60 can receive the sensed or measured voltage by way of communication between the comparator module 68 and the controller module 60. The comparator module 68 can further be communicatively connected with the second switch 30 by way of communication lines 66. In another non-limiting example, the comparator module 68 can include discrete analogue components, that is, without a processor 70 or memory 72.

Figure 3:
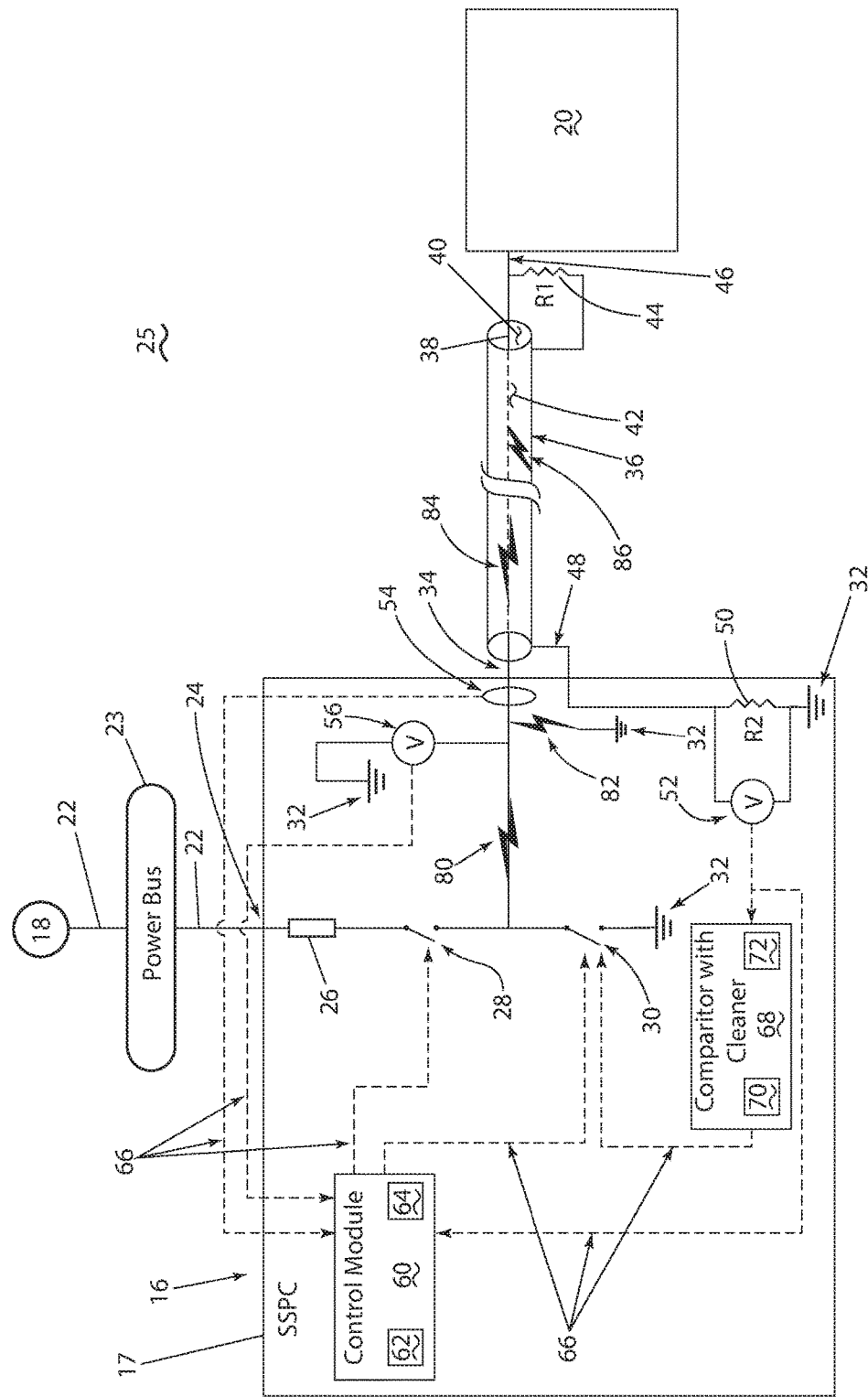
FIG. 3 is a schematic view of the circuit of the power distribution system of FIG. 2 with at least one electrical fault, in accordance with various aspects described herein.

During operation of the power distribution system, the circuit 25 can be adapted or configured to provide fault protection, such as arc fault protection. FIG. 3 illustrates the circuit 25 of FIG. 2, wherein one or more arc faults are or have occurred. As shown, a representative first series arc fault 80 occurs within the SSPC 17 between the first switch 28 and the SSPC output 34. Also as shown, a representative first parallel arc fault 82 occurs downstream of the first switch 28 and arcs to an electrical ground 32. Additionally, FIG. 3 illustrates a representative second series arc fault 84 occurs along an axial portion of the conductor 38 of the power cable 36. A representative second parallel arc fault 86 also occurs between the conductor 38 and the conductive sheath layer 42 of the power cable 36. In one non-limiting example, the parallel arc fault 86 of the power cable 36 can include little or no arcing due to a high impedance between the conductor 38 or sheath layer 42 to ground. The specific position of the arc faults 80, 82, 84, 86 illustrated are merely non-limiting schematic examples of arcing events within the SSPC 17 or the power cable 36.

In the illustrated examples, the controller module 60 is adapted or configured to detect the first series arc fault 80, the first parallel arc fault 82, or a combination thereof, by way of a change in electrical characteristics, such as current and voltage, sensed or measured by the current and first voltage sensors 54, 56. Likewise, the controller module 60 is adapted or configured to ultimately detect the second series arc fault 84, the second parallel arc fault 86, or a combination thereof. In this sense, the occurrence of the second series arc fault 84, the second parallel arc fault 86, or a combination thereof, will result in a change in electrical characteristics, such as a voltage, sensed or measured by the second voltage sensor 52. For example, a second series arc fault 84 can change the voltage sensed or measured by the second voltage sensor 52 to zero, or may alternate the voltage between zero and a non-zero value when arcing event occurs. In another example, a second parallel arc fault 86 can change the voltage sensed or measured by the second voltage sensor 52, as the second voltage sensor 52 "expects" a voltage measurement commensurate with the voltage divider between the first and second impedance elements 44, 50. In yet another example, aspects of the second series arc fault 84 or the second parallel arc fault 86 can be detected or sensed by electrical characteristic changes sensed or measured by the current sensor 54. Likewise, aspects of the first series arc fault 80 or the first parallel arc fault 82 can be detected or sensed by electrical characteristic changes sensed or measured by the second voltage sensor 52.

Regardless of which arc fault 80, 82, 84, 86, or combination of arc faults 80, 82, 84, 86 occur, the respective sensed or measured voltage(s) or current is provided to the controller module 60 for detection. Upon detection, the controller module 60 can generate a control signal, or otherwise command, the first switch 28 to open, to disconnect the supply of power received by the SSPC input 24 to the SSPC output 34. Typically, the disconnection of the power supply will extinguish the arc fault 80, 82, 84, 86 or combination of arc faults 80, 82, 84, 86. In addition to opening the first switch 28, the controller module 60 can generate a control signal, or otherwise command, the second switch 30 to close, allowing any leakage current a drain to electrical ground 32. Aspects of the disclosure can be included wherein the control signals provided to the first switch 28 and the second switch 30 are simultaneously generated or supplied, or sequentially generated or supplied, for example, introducing a timing delay between the signals.

Aspects of the disclosure can further be included wherein a failure of the first switch 28 can be accounted for during an arc fault 80, 82, 84, 86. For instance, in the example where the first switch 28 has failed in the closed position (e.g. the first switch 28 is not otherwise controllable to open and disconnect the power supply), the controller module 60 can be further configured to generate a control signal, or otherwise command, the second switch 30 to close, providing an otherwise unimpeded drain pathway of the supply of power received at the SSPC input 24 to the electrical ground 32. In this example, the unimpeded draining of current would be expected to exceed the predetermined or preselected protection characteristic defined by the fuse 26, causing the fuse to blow, which will disconnect the supply of power received at the SSPC input 24 from the SSPC output 34. In this sense, the circuit 25 can operate as a failsafe in the event of a failure of the first switch 28.

Further aspects of the disclosure can be included wherein failure of the controller module 60 can be accounted for during an arc fault 80, 82, 84, 86. For instance, in the example where the controller module 60 has failed (e.g. the controller module 60 does not detect the occurrence of one or more arc faults 80, 82, 84, 86, or otherwise fails to operate in response to the one or more arc faults 80, 82, 84, 86 to disable the power supply to the SSPC output 34), the circuit 25 can still operate to cease the supply of power to the SSPC output 34. In this example, the second voltage sensor 52 can sense or measure electrical characteristics representative of the occurrence of one or more arc faults 80, 82, 84, 86, and simultaneously provide the sensed or measured electrical characteristics to the controller module 60 (which is non-functional in this example) and the comparator module 68. In this sense, the comparator module 68 can receive the sensed or measured electrical characteristics and compare the voltage values with threshold values representative of the occurrence of one or more arc faults 80, 82, 84, 86. Upon satisfaction of the comparison, it can be determined one or more arc faults 80, 82, 84, 86 are or have occurred. The term "satisfaction" of the comparison is used herein to mean that the sensed values satisfies the predetermined threshold, such as being equal to or less than the threshold value, or being within the threshold value range. It will be understood that such a determination may easily be altered to be satisfied by a positive/negative comparison or a true/false comparison. Non-limiting examples of the comparator module 68 can include hardware-based comparators, such as operational amplifiers.

The comparator module 68 can further be adapted or configured to directly generate a second control signal, or otherwise command, the second switch 30 to close, to connect the first switch 28 with the electrical ground 32. In one non-limiting example, the comparator module 68 can operate with a time or timing delay, defining a dynamic or preset time. In this sense, upon the determination by the comparator module 68 that one or more arc faults 80, 82, 84, 86 are or have occurred, a timer can start to keep track of the length of the one or more arc fault 80, 82, 84, 86 occurrence(s). When the timer exceeds the time or timing delay, the comparator module 68 can directly control or command the second switch 30 to close. In this sense, the second switch 30 can be independently controllable by either the controller module 60 or the comparator module 68.

In another non-limiting example, the circuit 25 can be configured or adapted wherein the controller module 60 is not communicatively connected with the second switch 30, and does not include the failsafe mechanism to control the second switch 30 described herein.

In the event that the first switch 28 is also closed, the supply of power received at the SSPC input 24 will drain to the electrical ground, blowing the fuse 26, as described herein. In one non-limiting example, the timing delay can be greater than the expected time needed for the non-failed or correct operation of the controller module 60 to recognize or determine an arc fault 80, 82, 84, 86 is or has occurred, in addition to controllably operating the first switch to open. In this sense, the expiration of the timing delay, without the ceasing of the arc fault 80, 82, 84, 86 occurrence can indicate that the controller module 60 has stopped functioning, or is unable to operably control the first switch 28 to open. In this sense, the operation of the timing with the comparator module 68 can act or operate as a failsafe or redundant operator in the event of a failed controlled module 60 operation.

Figure 4:
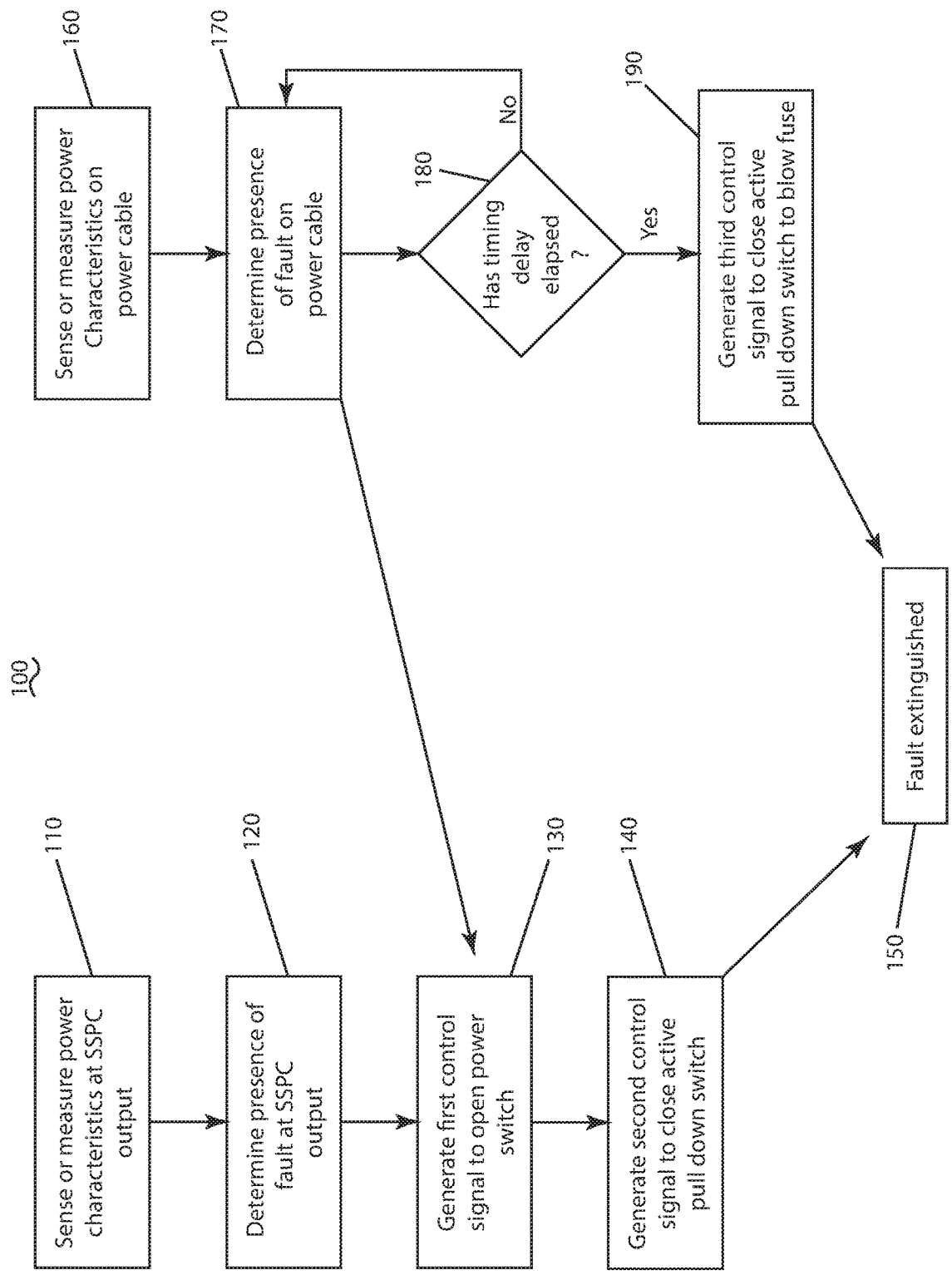
FIG. 4 is an example a flow chart diagram of demonstrating a method of operating the circuit of FIG. 2, in accordance with various aspects described herein.

FIG. 4 illustrates a flow chart demonstrating a method 100 of operating the circuit for the detection of arc faults 80, 82, 84, 86, as described herein. The method 100 can begin by either sensing or measuring a power characteristic (e.g. a voltage or a current) at either the SSPC output 34 at step 110 or at the power cable 36 at step 160. If the method 100 begins at step 110, the method 100 can continue to determining the presence of an arc fault 80, 82 downstream of the SSPC output 34 by receiving in the controller module 60 the sensed voltage or current, as described herein, at 120. The determination in step 120 can be based, for example, on a comparison of the sensed voltage or current with an arc fault profile, or known arc fault electrical characteristics. Upon satisfaction of the comparison, the determination can be made by the controller module 60 that an arc fault 80, 82 is or has occurred. If the occurrence of an arc fault 80, 82 is determined, the method 100 can continue to generate a first control signal, by the controller module 60, to open the first switch 28 or the power switch, at 130.

The controller module 60 can further generate a second control signal to close the second switch 30 or the active pull down switch, at 140. The method 100 then concludes when the arc fault(s) 80, 82, 84, 86 are extinguished, at 150.

If the method 100 begins at step 160, the method 100 can continue to determining the presence of an arc fault 84, 86 on the power cable 36, as described herein, at 170. The determination in step 170 can be based, for example, on a comparison of the sensed voltage or current with an arc fault profile, or known arc fault electrical characteristics. Upon satisfaction of the comparison, the determination can be made by the comparator module 68 that an arc fault 84, 86 is or has occurred. Upon the determination that an arc fault 84, 86 is or has occurred, the method 100 can continue to step 130, wherein the controller module 60 generates the control signal to open the first switch 28, followed by steps 140 and 150. In step 170, the method 100, in addition to returning to step 130, can simultaneously initiate a timing counter at the comparator module 68 and proceed to step 180.

In step 180, if the timing delay has not elapsed, the method 100 can return to step 170 to confirm the determination that an arc fault 84, 86 is still occurring. In step 180, if the timing delay has elapsed, and the arc fault 84, 86 is still occurring, the method 100 can continue to step 190, wherein the comparator module 68 generates a third failsafe control signal to close the second switch 30 or the active pull down switch in order to blow the fuse 26, as described herein. Upon blowing the fuse 26, the method then concludes when the arc fault(s) 80, 82, 84, 86 are extinguished, at 150.

The sequence depicted is for illustrative purposes only and is not meant to limit the method 100 in any way as it is understood that the portions of the method 100 can proceed in a different logical order, additional or intervening portions can be included, or described portions of the method 100 can be divided into multiple portions, or described portions of the method can be omitted without detracting from the described method.

Many other possible aspects and configurations in addition to that shown in the above figures are contemplated by the present disclosure. Additionally, non-limiting aspects of the disclosure can be included wherein any number of power generator systems can be included (e.g. three generator systems, four generator systems, five generator systems, etc.) in the power distribution system to provide supplemental or redundant power outputs or power supplies, as needed or desired. Additionally, the design and placement of the various components can be rearranged such that a number of different in-line configurations could be realized.

The aspects disclosed herein provide a method and circuit for detecting an arc fault occurrence and extinguishing the arc fault. The technical effect is that the above described aspects enable the operation of the circuit allowing or enabling the detecting and extinguishing of one or more arc faults in an electrical network or circuit, with built-in failsafe redundancies. One advantage that can be realized in the above aspects of the disclosure is that the redundant operation to extinguished arc faults can limit damage of an energy escape during the arcing event. Furthermore, the redundant operation of the above-described aspects can aid in or result in certification of arc fault protection control schemas, for example, in aviation applications. In the example, of aviation certification, redundant systems having dissimilar implementations (e.g. software based and hardware based) will be considered. The above-described aspects include both control schema (e.g. the controller module) and hardware instances (e.g. the fuse).

Aspects of the disclosure can further allow for the high voltage power (e.g. 270 or 540 Volt DC power) while ensuring electrical faults are still adequately managed so to not allow for high current faults, minimizing or reducing arc to ground fault risks. By reducing and managing the fault currents, high current DC circuit breakers are not required, reducing costs and weight for the power system. Another advantage can include reducing weight by way of requiring smaller wire separation distances (EWIS) and less or lighter mechanical protection or shielding mechanisms. Another advantage of the above described aspects is that the power distribution system allows for reconfiguration in flight or in process to enable or disable electrical loads not necessary at that particular instances, while providing redundancies in power supply to a set of electrical loads, such as flight critical or emergency loads.

When designing aircraft components, important factors to address are size, weight, and reliability. The above described power distribution system results in a lower weight, smaller sized, increased performance, and increased reliability system. The lower number of parts and reduced maintenance will lead to a lower product costs and lower operating costs. Reduced weight and size correlate to competitive advantages during flight.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

This written description uses examples to disclose aspects of the disclosure, including the best mode, and also to enable any person skilled in the art to practice aspects of the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

Further aspects of the invention are provided by the subject matter of the following clauses:

1. A method of detecting a fault in a circuit, the method comprising: sensing a power characteristic at a switch output; receiving, at a controller module, the sensed power characteristic; determining, in the controller module, a presence of a fault in the circuit; generating a first control signal to open the switch; determining, in the controller module, whether the fault in the circuit is still occurring; and if the fault is still occurring, generating a second control signal to close an active pull down switch.

2. The method of any of the disclosed aspects wherein determining the presence of a fault in the circuit includes determining the presence of a fault downstream of a solid state power controller or a conductor.

3. The method of any of the disclosed aspects wherein the conductor is a power cable having a conductive shielding.

4. The method of any of the disclosed aspects wherein the sensing the power characteristic at the switch output includes sensing a voltage of the conductive shielding.

5. The method of any of the disclosed aspects wherein determining whether the fault in the circuit is still occurring includes determining that a power supply is still being supplied to the switch output.

6. The method of any of the disclosed aspects wherein determining whether the fault in the circuit is still occurring includes determining that at least one of the switch has failed or that the switch has not opened.

7. The method of any of the disclosed aspects, further comprising, in response to generating the second control signal, closing the active pull down switch to complete a conductive pathway from a power source, through the switch and the active pull down switch, to an electrical ground.

8. The method of any of the disclosed aspects, wherein the conductive pathway includes a fuse, and wherein in response to the completed conductive pathway through the fuse, the fuse disables delivery of power through the switch.

9. The method of any of the disclosed aspects, wherein determining whether the fault in the circuit is still occurring further includes determining whether the fault in the circuit is still occurring after an expiration of a delay timer.

10. A method of detecting a fault in a circuit, the method comprising: comparing, in a comparator module, a sensed power characteristic with a threshold value representative of an occurrence of a fault in the circuit; determining, by the comparator module, a fault is present based on the comparing; generating a first control signal to open a power switch to disable supplying power upstream of the fault; and upon a failure to open the power switch to disable supplying power upstream of the fault, generating a second control signal to close an active pull down switch to redirect supplying power to an electrical ground.

11. The method of any of the disclosed aspects, further comprising determining whether an opening of the power switch has failed.

12. The method of any of the disclosed aspects wherein determining whether the opening of the power switch has failed includes determining whether the fault is still present after an expiration of a delay timer.

13. The method of any of the disclosed aspects wherein the power switch is a solid state power controller and wherein generating the first control signal includes determining, by a controller module of the solid state power controller, the first control signal to open the power switch.

14. The method of any of the disclosed aspects wherein determining whether the opening of the power switch has failed includes determining whether the controller module has failed.

15. The method of any of the disclosed aspects, further comprising, upon failure of the controller module, generating, by the comparator module, the second control signal to close an active pull down switch.

16. The method of any of the disclosed aspects wherein redirecting supplying power from the fault to the electrical ground disables the circuit by blowing a fuse.

17. A circuit, comprising: a power switch operable to supply power from a power source to an electrical load; a sensor configured to sense an electrical characteristic of the circuit; a controller module communicatively connected with the power switch and the sensor, and configured to control a supplying of power from the source to the electrical load, to receive the sensed electrical characteristic of the circuit, and to controllably cease the supplying of power from the power source to the electrical load, by the power switch, in response to determining the received sensed electrical characteristic is indicative of a presence of a fault; and a comparator module communicatively connected with the sensor and configured to receive the sensed electrical characteristic of the circuit, and upon failure of the controller module to controllably cease the supplying of power from the source to the electrical load by the power switch, operably control an active pull down switch to redirect the supplying power from the power source to an electrical ground.

18. The circuit of any of the disclosed aspects wherein the power switch and the active pull down switch are arranged in series between the power source and the electrical ground.

19. The circuit of any of the disclosed aspects, further comprising a fuse in series with the power switch and the active pull down switch, and wherein the comparator module is further configured to redirect the supplying power from the power source to the electrical ground to blow the fuse to cease the supplying of power from the power source.

20. The circuit of any of the disclosed aspects wherein failure of the controller module to controllably cease the supplying of power from the source to the electrical load by the power switch includes failure of the controller module or failure of the power switch to open the circuit between the power source and the electrical load.

This written description uses examples to disclose aspects of the disclosure, including the best mode, and also to enable any person skilled in the art to practice aspects of the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of detecting a fault in a circuit, the method comprising:
    sensing a power characteristic at a switch output;
    receiving, at a controller module, the sensed power characteristic;
    determining, in the controller module, a presence of a fault in the circuit;
    generating a first control signal to open the switch;
    determining, in the controller module, whether the fault in the circuit is still occurring;
    if the fault is still occurring, generating a second control signal to close an active pull down switch; and
    in response to generating the second control signal, closing the active pull down switch to complete a conductive pathway from a power source, through the switch and the active pull down switch, to an electrical ground.

2. The method of claim 1 wherein determining the presence of a fault in the circuit includes determining the presence of a fault downstream of a solid state power controller or a conductor.

3. The method of claim 2 wherein the conductor is a power cable having a conductive shielding.

4. The method of claim 3 wherein the sensing the power characteristic at the switch output includes sensing a voltage of the conductive shielding.

5. The method of claim 1 wherein determining whether the fault in the circuit is still occurring includes determining that a power supply is still being supplied to the switch output.

6. The method of claim 1 wherein determining whether the fault in the circuit is still occurring includes determining that at least one of the switches has failed or that the switch has not opened.

7. The method of claim 1, wherein the conductive pathway includes a fuse, and wherein in response to the completed conductive pathway through the fuse, the fuse disables delivery of power through the switch.

8. The method of claim 1, wherein determining whether the fault in the circuit is still occurring further includes determining whether the fault in the circuit is still occurring after an expiration of a delay timer.

9. A method of detecting a fault in a circuit, the method comprising:
    comparing, in a comparator module, a sensed power characteristic with a threshold value representative of an occurrence of a fault in the circuit;
    determining, by the comparator module, a fault is present based on the comparing;
    generating a first control signal to open a power switch to disable supplying power upstream of the fault; and
    upon a failure to open the power switch to disable supplying power upstream of the fault, generating a second control signal to close an active pull down switch to redirect supplying power to an electrical ground.

10. The method of claim 9, further comprising determining whether an opening of the power switch has failed.

11. The method of claim 10 wherein determining whether the opening of the power switch has failed includes determining whether the fault is still present after an expiration of a delay timer.

12. The method of claim 10 wherein the power switch is a solid state power controller and wherein generating the first control signal includes determining, by a controller module of the solid state power controller, the first control signal to open the power switch.

13. The method of claim 12 wherein determining whether the opening of the power switch has failed includes determining whether the controller module has failed.

14. The method of claim 13, further comprising, upon failure of the controller module, generating, by the comparator module, the second control signal to close an active pull down switch.

15. The method of claim 9 wherein redirecting supplying power from the fault to the electrical ground disables the circuit by blowing a fuse.

16. A circuit, comprising:
    a power switch operable to supply power from a power source to an electrical load;
    a sensor configured to sense an electrical characteristic of the circuit;
    a controller module communicatively connected with the power switch and the sensor, and configured to control a supplying of power from the source to the electrical load, to receive the sensed electrical characteristic of the circuit, and to controllably cease the supplying of power from the power source to the electrical load, by the power switch, in response to determining the received sensed electrical characteristic is indicative of a presence of a fault; and
    a comparator module communicatively connected with the sensor and configured to receive the sensed electrical characteristic of the circuit, and upon failure of the controller module to controllably cease the supplying of power from the source to the electrical load by the power switch, operably control an active pull down switch to redirect the supplying power from the power source to an electrical ground.

17. The circuit of claim 16 wherein the power switch and the active pull down switch are arranged in series between the power source and the electrical ground.

18. The circuit of claim 17, further comprising a fuse in series with the power switch and the active pull down switch, and wherein the comparator module is further configured to redirect the supplying power from the power source to the electrical ground to blow the fuse to cease the supplying of power from the power source.

19. The circuit of claim 16 wherein failure of the controller module to controllably cease the supplying of power from the source to the electrical load by the power switch includes failure of the controller module or failure of the power switch to open the circuit between the power source and the electrical load.

* * * * *